(12) United States Patent
Endo et al.

(10) Patent No.: US 7,096,775 B2
(45) Date of Patent: Aug. 29, 2006

(54) PNEUMATIC BOOSTER

(75) Inventors: Mitsuhiro Endo, Yamanashi-ken (JP); Shuzo Watanabe, Yamanashi-ken (JP)

(73) Assignee: Hitachi, Ltd., Tokyo (JP)

( * ) Notice: Subject to any disclaimer, the term of this patent is extended or adjusted under 35 U.S.C. 154(b) by 3 days.

(21) Appl. No.: 10/992,817

(22) Filed: Nov. 22, 2004

(65) Prior Publication Data
US 2005/0115400 A1 Jun. 2, 2005

(30) Foreign Application Priority Data
Nov. 28, 2003 (JP) ............................. 2003-399866

(51) Int. Cl.
*B60T 13/563* (2006.01)
(52) U.S. Cl. .................................... 92/169.3
(58) Field of Classification Search ............... 92/169.3; 91/376 R
See application file for complete search history.

(56) References Cited
U.S. PATENT DOCUMENTS
6,050,174 A * 4/2000 Schonlau et al. .......... 92/169.3
6,189,437 B1 * 2/2001 Morlan ...................... 92/169.3
6,651,548 B1 * 11/2003 Faller ........................ 92/169.3
6,772,674 B1 * 8/2004 Kasselman et al. ........ 92/169.3
6,883,415 B1 * 4/2005 Kawasumi et al. ....... 91/376 R

FOREIGN PATENT DOCUMENTS
JP    56-163947    12/1981

* cited by examiner

*Primary Examiner*—Thomas E. Lazo
(74) *Attorney, Agent, or Firm*—Wenderoth, Lind & Ponack, L.L.P.

(57) ABSTRACT

In a pneumatic booster, a front shell and a rear shell are connected by means of a rod. A stud bolt on one end of the rod extends through the front shell to the outside, and a support plate fitted around the stud bolt is engaged with the rod and abutted against an inner surface of the front shell. A seal member is provided in an annular groove formed in the support plate. A projection is formed in the support plate. When the support plate is reversely mounted on the stud bolt, the projection is abutted against the front shell, and the seal member is unable to provide a seal between the stud bolt and the front shell. In a leak inspection, air is flowed into a constant-pressure chamber through a cut portion formed in a distal end of the projection, to thereby detect reverse mounting of the support plate.

18 Claims, 7 Drawing Sheets

PNEUMATIC BOOSTER

BACKGROUND OF THE INVENTION

The present invention relates to a pneumatic booster used for a brake system of a vehicle. Specifically, the present invention relates to a through-rod type pneumatic booster comprising a shell body formed by a front shell and a rear shell which are connected by means of a rod so as to increase rigidity of the shell body.

Conventionally, as indicated in Japanese Patent Application Public Disclosure No. 56-163947, a through-rod type pneumatic booster comprises a front shell and a rear shell, which form a shell body. A power piston is provided in the shell body. The front shell and the rear shell are connected by means of a rod which extends through the power piston. A stud bolt is formed on one end of the rod, and extends through the front shell to the outside. A support member is fitted around the stud bolt. The support member is engaged with the rod and abutted against an inner surface of the front shell. An annular groove is formed in the support member. A seal member is provided in the annular groove so as to seal a space between the front shell and the stud bolt.

FIG. 7 shows a seal structure formed around the stud bolt in the through-rod type pneumatic booster. In FIG. 7, reference numeral 1 denotes a front shell which forms a shell body; 2 a rod connecting the front shell 1 and a rear shell (not shown); 3 a stud bolt formed on one end of the rod 2; 4 a support plate (a support member) fitted around the stud bolt 3; and 5 a seal member held by the support plate 4. The support plate 4 is engaged with an end face (a stepped surface) 2a of the rod 2, with a surface 4a thereof abutting against an inner surface of the front shell 1. The seal member 5 is provided in an annular groove 6 formed at a radially inner portion of the surface 4a of the support plate 4, to thereby seal a space between the front shell 1 and the stud bolt 3. The stud bolt 3 is used for mounting a master cylinder M on the pneumatic booster. A flange F of the master cylinder M and the front shell 1 are fastened between the support plate 4 and a nut N threadably engaged with the stud bolt 3.

After assembly, the pneumatic booster is subjected to a leak inspection prior to shipment. In the above-mentioned seal structure in which the seal member 5 is provided in the support plate 4, even when the support plate 4 is reversely mounted on the rod 2 as shown in FIG. 8, a space between the front shell 1 and the stud bolt 3 is sealed by the seal member 5, and the booster passes the leak inspection. In this case, however, as shown in FIG. 8, a space S is formed between the support plate 4 and the front shell 1, so that the support plate 4 is unable to support the front shell 1. Therefore, the front shell 1 is likely to be deformed due to application of external force, and therefore, a hermetic seal between the front shell 1 and the stud bolt 3 may be impaired.

SUMMARY OF THE INVENTION

In view of the above, the present invention has been made. It is an object of the present invention to enable reverse mounting of the support plate on the rod which connects the front shell and the rear shell to be reliably detected during a leak inspection. It is another object of the present invention to ensure that a supporting function of the support plate is not impaired even when the support plate is reversely mounted.

The present invention provides a pneumatic booster comprising:
a shell body formed by a front shell and a rear shell;
a power piston provided in the shell body;
a rod extending through the power piston and connecting the front shell and the rear shell;
a stud bolt formed on one end of the rod, the stud bolt extending through the shell body to the outside;
a support member fitted around the stud bolt, the support member being engaged with the rod and abutted against an inner surface of the shell body; and
a seal member provided in an annular groove formed in a surface of the support member, the seal member being adapted to seal a space between the shell body and the stud bolt,
the support member having a projection formed on a surface thereof opposite to the surface in which the annular groove is formed, the projection having a protruding length greater than a thickness of the seal member, a distal end of the projection being adapted to abut against the shell body around the seal member when the support member is reversely mounted.

In this pneumatic booster, when the support plate is reversely mounted, the projection of the support member abuts against the inner surface of the shell body, so that the support member is unable to hold the seal member, and gas leakage occurs during a leak inspection.

The form of the projection of the support member is not particularly limited. However, it is preferred that the projection have a cylindrical form, from the viewpoint of ease of manufacture. In this case, if the support member is reversely mounted, with the entire distal end surface of the projection making contact with the shell body, smooth flow of fluid is prevented. Therefore, it is preferred that the support member include a communication passage for allowing communication between an inner side and an outer side of the cylindrical projection.

The present invention also provides a pneumatic booster comprising:
a shell body formed by a front shell and a rear shell;
a power piston provided in the shell body;
a rod extending through the power piston and connecting the front shell and the rear shell;
a stud bolt formed on one end of the rod, the stud bolt extending through the shell body to the outside;
a support member fitted around the stud bolt, the support member being engaged with the rod and abutted against an inner surface of the shell body; and
a seal member provided in an annular groove formed in a surface of the support member, the seal member being adapted to seal a space between the shell body and the stud bolt,
the support member including an annular groove which is formed in a surface of the support member opposite to the surface in which the annular groove for the seal member is formed and which has a symmetric relation to the annular groove for the seal member.

In this pneumatic booster, a front surface and a rear surface of the support member are of symmetrical configuration relative to each other. Therefore, either the front surface or the rear surface of the support member can be connected to the rod, without the risk of preventing abutment of the support member against the shell body.

The present invention further provides a seal structure comprising:
a shell body;
a stud bolt extending through the shell body; and a seal device for sealing a gap between the shell body and the stud bolt, the seal device, when mounted in a normal position, being adapted to seal the gap between the shell body and the stud bolt, and when mounted in an abnormal position, being adapted to allow communication between an inner side and an outer side of the shell body through the gap.

The present invention further provides a seal structure comprising:

a shell body;

a stud bolt extending through the shell body; and a seal device for sealing a gap between the shell body and the stud bolt, the seal device, when mounted in a first position, being adapted to seal the gap between the shell body and the stud bolt, and when mounted in a second position, being also adapted to seal the gap between the shell body and the stud bolt.

DETAILED DESCRIPTION OF THE INVENTION

Hereinbelow, referring to the accompanying drawings, embodiments of the present invention are described.

Figure 1A:
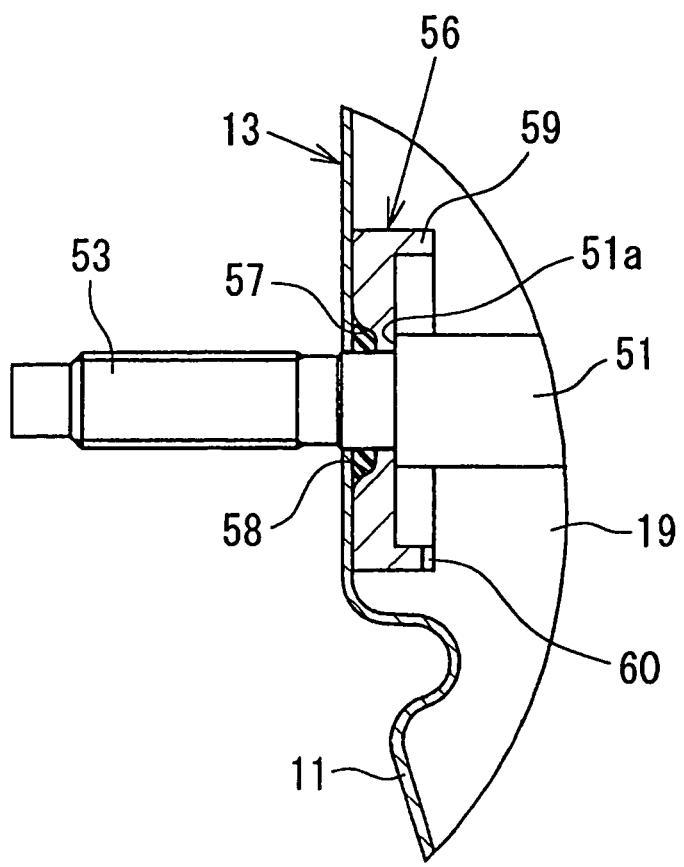
FIG. 1(A) is a cross-sectional view showing a seal structure formed around a stud bolt in a pneumatic booster according to an embodiment of the present invention, wherein a support plate is normally mounted.
Figure 2:
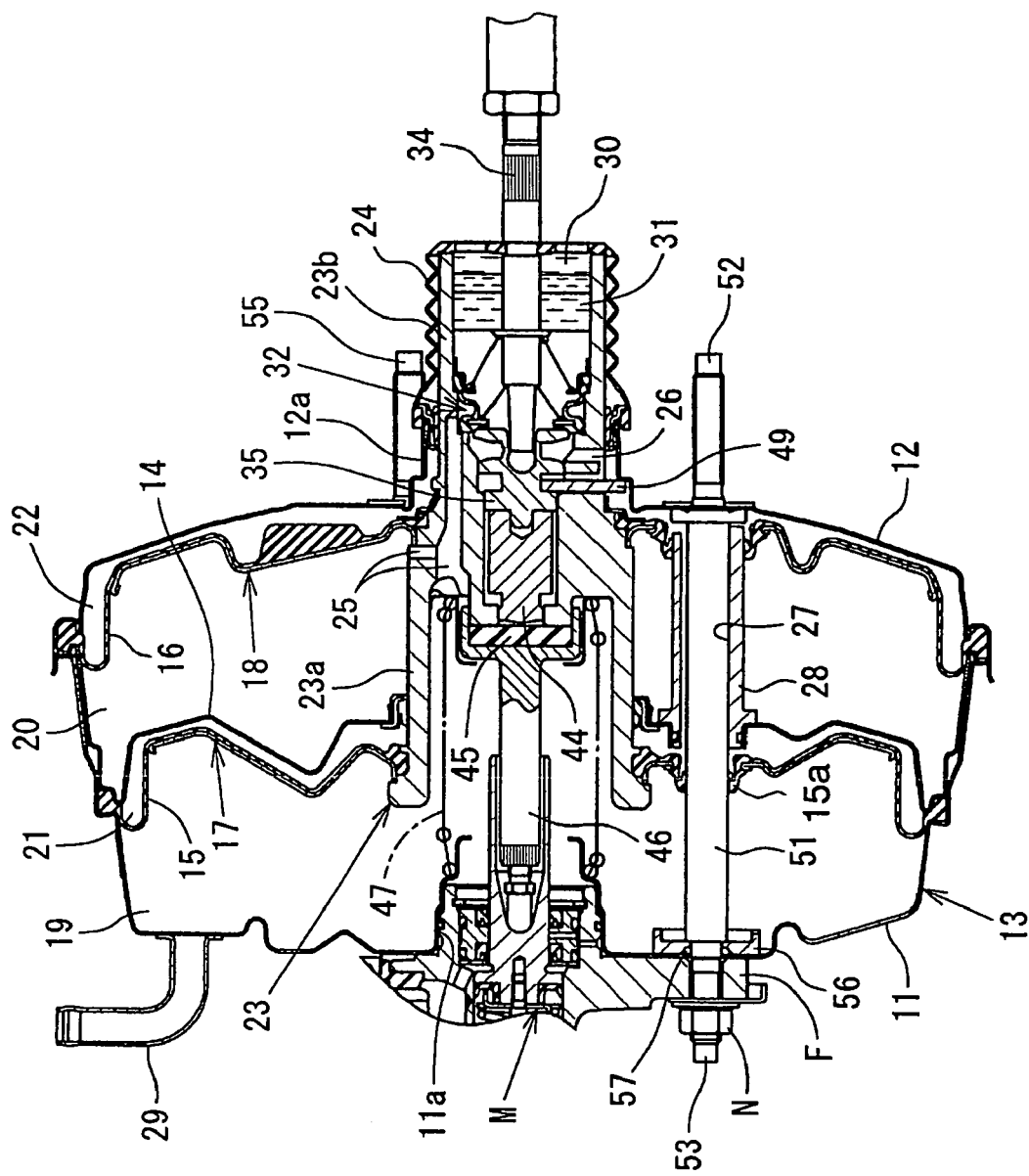
FIG. 2 is a cross-sectional view of the pneumatic booster in the embodiment of the present invention.
Figure 3:
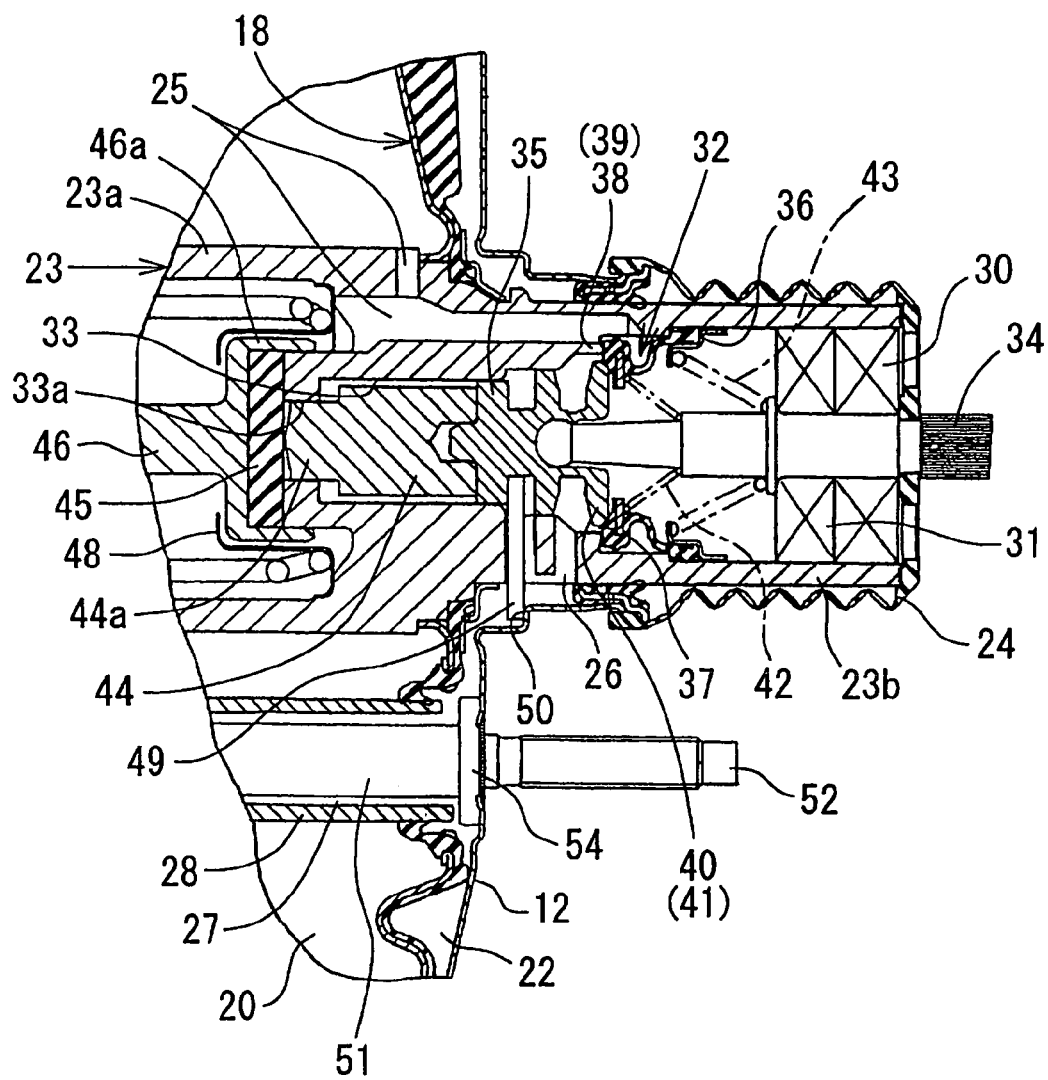
FIG. 3 is a cross-sectional view showing an essential part of the pneumatic booster of the present invention.

FIG. 1(A), FIG. 2 and FIG. 3 show a through-rod type pneumatic booster according to an embodiment of the present invention. A pneumatic booster in this embodiment is a tandem type. FIG. 2 shows an entire structure of the pneumatic booster.

The pneumatic booster comprises: a shell body 13 comprising a front shell 11 and a rear shell 12; a center shell 14 which divides an inside of the shell body 13 into two chambers on a front side and a rear side of the shell body; and power pistons 17 and 18. The power piston 17 includes a diaphragm 15 and divides the front-side chamber into a constant-pressure chamber 19 and a working-pressure chamber 21. The power piston 18 includes a diaphragm 16 and divides the rear-side chamber into a constant-pressure chamber 20 and a working-pressure chamber 22. A valve body 23 is held by the power piston 17 and the power piston 18. The valve body 23 comprises a cup-shaped body portion 23a and a small-diameter cylindrical portion 23b. The cup-shaped body portion 23a slidably extends through the center shell 14 in a gas-tight manner, and the small-diameter cylindrical portion 23b slidably extends through the rear shell 12 in a gas-tight manner. Specifically, the valve body 23 extends through a small-diameter cylindrical portion 12a of the rear shell 12. A dust boot 24 is connected to the small-diameter cylindrical portion 12a so as to cover a portion of the valve body 23 extending beyond the shell body 13.

The body portion 23a of the valve body 23 includes a negative-pressure passage 25 which allows communication between the two constant-pressure chambers 19 and 20 and communication between an inside of the small-diameter cylindrical portion 23b and each of the constant-pressure chambers 19 and 20. The body portion 23a of the valve body 23 further includes a first air passage 26 for communication between the inside of the small-diameter cylindrical portion 23b and the rear-side working-pressure chamber 22. In the rear-side constant-pressure chamber 20, there are provided a plurality (two in this embodiment) of communication tubes 28 providing second air passages 27 for communication between the rear-side working-pressure chamber 22 and the front-side working-pressure chamber 21. In FIG. 2, one of the two communication tubes 28 is omitted. Each communication tube 28 has one end and an opposite end, and the one end is press-fitted into the center shell 14. The opposite end is slidably inserted through the rear-side power piston 18 in a gas-tight manner and extends to a position in proximity to the rear shell 12. A negative pressure from an engine is introduced into the front-side constant-pressure chamber 19 through a joint tube 29 connected to the front shell 11. This negative pressure is also supplied to the rear-side constant-pressure chamber 20 through the negative-pressure passage 25. Air is introduced into the small-diameter cylindrical portion 23b of the valve body 23 through a silencer 30 and a filter 31 fittingly disposed in a rear end portion of the small-diameter cylindrical portion 23b. The air which has been introduced into the small-diameter cylindrical portion 23b is supplied to the front-side and rear-side working-pressure chambers 21 and 22 through the first and second air passages 26 and 27 by operation of a valve mechanism 32, which is described later.

As is clearly shown in FIG. 3, the valve mechanism 32 comprises a valve plunger 35, a poppet valve 37, a vacuum valve 39, an air valve 41 and a valve spring 42.

The valve plunger 35 is slidably fitted into an axial opening 33 formed in the body portion 23a of the valve body 23 and is connected to an input rod 34 which moves according to a movement of a brake pedal (not shown).

The poppet valve 37 has a proximal end portion, which is fixed to an inner surface of the small-diameter cylindrical portion 23b of the valve body 23 by means of a retaining member 36.

The vacuum valve 39 is formed by an outer circumferential edge of a distal end portion of the poppet valve 37 and an annular valve seat 38 formed in an inner circumferential surface of the valve body 23.

The air valve 41 is formed by an inner circumferential edge of the distal end portion of the poppet valve 37 and an annular valve seat 40 formed in a rear end portion of the valve plunger 35.

The valve spring 42 has one end engaged with the input rod 34 and normally biases the poppet valve 37 in a valve closing direction. A return spring 43 is interposed between the retaining member 36 and the input rod 34. In a non-operating state in which no input is applied from the brake pedal, the return spring 43 acts to hold the valve plunger 35 in a position such that the annular valve seat 40, which is formed in the rear end portion of the valve plunger 35, abuts against the poppet valve 37.

A stepped movable body 44 is accommodated in the axial opening 33 of the valve body 23. A rear end portion of the stepped movable body 44 is connected to the valve plunger 35, and the stepped movable body 44 is adapted to move with the valve plunger 35. The movable body 44 includes a small-diameter portion 44a on a forward end thereof. The small-diameter portion 44a is slidably inserted into a small-diameter opening 33a of the axial opening 33. A reaction disk 45 made of an elastic material, such as rubber, and a proximal-end cup portion 46a of an output rod 46 are provided in a cup-like end of the body portion 23a of the valve body 23. The movable body 44 is capable of abutting against a rear surface of the reaction disk 45. As shown in FIG. 2, a distal end portion of the output rod 46 extends in a forward direction through an end of a recess 11a, which is formed by recessing a front surface of the front shell 11. The distal end portion of the output rod 46 is operatively connected to a master cylinder M (FIG. 1), which is connected to the recess 11a in a gas-tight manner.

A return spring 47 for returning the valve body 23 to its original position is provided in the front-side constant-pressure chamber 19. The return spring 47 has one end abutted against the front shell 11 on a rear side of the recess 11a and the other end abutted against the cup-like end of the valve body 23 through a spring bearing 48. Thus, the valve body 23 is normally biased towards the rear side of the shell body 13 (in a return direction) by means of the return spring 47. A stop key 49 is radially inserted into the valve body 23 at a position substantially corresponding to a boundary between the body portion 23a and the small-diameter cylindrical portion 23b. The original position of the valve body 23 is such that the stop key 49 abuts against a stepped portion 50 formed in the small-diameter cylindrical portion 12a of the rear shell 12. A forward end of the stop key 49 is loosely fitted into a groove formed in the valve plunger 35. The stop key 49 limits a range of movement of the valve plunger 35 relative to the valve body 23. The spring bearing 48 prevents separation of the reaction disk 45 and the output rod 46 from the valve body 23.

The communication tubes 28 allow communication between the rear-side working-pressure chamber 22 and the front-side working-pressure chamber 21. As shown in FIG. 2, a through-rod (a rod) 51 is inserted through each of the communication tubes 28.

The through-rod 51 slidably extends through the front-side power piston 17 in a gas-tight manner and connects the front shell 11 and the rear shell 12. The diaphragm 15 of the front-side power piston 17 includes a rod seal 15a, which is provided along a circumferential surface of the through-rod 51. The rod seal 15a seals a space between the diaphragm 15 and the through-rod 51 which slidably extends through the diaphragm 15. Opposite ends of the through-rod 51 are integrally formed with a stud bolt 52 and a stud bolt 53, respectively. The stud bolt 52 extends through the rear shell 12 to the outside, and the stud bolt 53 extends through the front shell 11 to the outside.

As shown in FIG. 3, the through-rod 51 has a flange 54 provided on a rear-side proximal end portion of thereof. The rear side of the through-rod 51 is fixed to the rear shell 12 by crimping the rear shell 12 onto the flange 54. The rear-side stud bolt 52 is located inward of the crimped portion of the rear shell 12 on the flange 54, to thereby secure a hermetic seal between the rear shell 12 and the stud bolt 52. The rear-side stud bolt 52 is used as a mounting bolt for mounting the pneumatic booster on a vehicle body. In this embodiment, two rear-side stud bolts 52 (one of which is omitted), each being integral with a corresponding through-rod 51, are provided and arranged at 180°-intervals in a circumferential direction. In addition to the stud bolts 52 integral with the through-rods 51, two stud bolts 55 (FIG. 2; one of which is omitted), which extend from a rear surface of the rear shell 12, are provided. The stud bolts 55 are disposed at an angle of 90 degrees relative to the stud bolts 52. The pneumatic booster in this embodiment is mounted on a vehicle body by utilizing these stud bolts 52 and 55. In this embodiment, the stud bolts 55 are disposed at an angle of 90 degrees relative to the stud bolts 52. However, the angle between the stud bolts 55 and the stud bolts 52 is not limited to 90 degrees.

As is clearly shown in FIG. 1(A), a front side of the through-rod 51 is connected to the front shell 11 through a support plate (a support member) 56 fitted around the stud bolt 53 and a seal member 57 held by the support plate 56. Illustratively stated, a surface of the support plate 56 is abutted against an inner surface of the front shell 11, with one end of the support plate 56 being engaged with an end face (a stepped surface) 51a of the through-rod 51. An annular groove 58 is formed at a radially inner portion of the surface of the support plate 56. The seal member 57 is provided in the annular groove 58. The front-side stud bolt 53 is inserted through the front shell 11 and extends in a forward direction. As shown in FIG. 2, the flange F of the master cylinder M is fitted around the forwardly extended portion of the front-side stud bolt 53. The flange F of the master cylinder M, together with the front shell 11, is fastened to the support plate 56 by means of a nut N threadably engaged with the stud bolt 53. When the flange F and the front shell 11 are fastened to the support plate 56, the seal member 57 is subject to compressive deformation in the annular groove 58, and makes intimate contact with a circumferential surface of the stud bolt 53. Consequently, a space between the front shell 11 and the stud bolt 53 are sealed. It should be noted that the support plate may be provided on the rear side of the through-rod 51. In this case, the support plate is abutted against an inner surface of the rear shell 12.

As shown in FIG. 1(A), a cylindrical projection 59 is formed on a surface of the support plate 56 opposite to the surface in which the annular groove 58 for the seal member 57 is formed. The cylindrical projection 59 extends from an outer circumferential edge of the support plate 56, and has a protruding length greater than a thickness of the seal member 57 (a thickness in an uncompressed state). It is preferred that the cylindrical projection 59 be located radially outward of an outer diameter of the rod seal 15a, which is provided in the diaphragm 15 of the power piston 17 so as to seal the rod 51. With this arrangement, it is possible to prevent contact between the rod seal 15a and the cylindrical projection 59 resulting from a full stroke of the power piston 17 in a forward direction. A cut portion 60 is formed at a circumferential portion of a distal end of the cylindrical projection 59. As shown in FIG. 1(A), when the support plate 56 is normally mounted on the stud bolt 53 integral with the through-rod 51, the cylindrical projection 59 is disposed around the through-rod 51, with a space being formed therebetween. Therefore, the cylindrical projection 59 does not interfere with the mounting of the support plate 56 on the stud bolt 53.

Figure 1B:
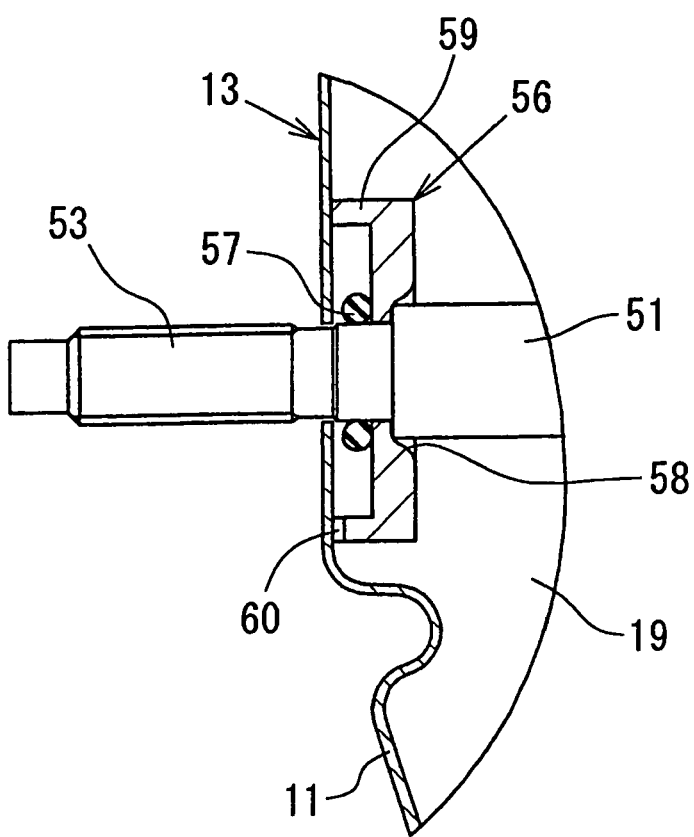
FIG. 1(B) is a cross-sectional view showing the reversely mounted position of the support plate in the seal structure of FIG. 1(A).

As shown in FIG. 1(B), if the support plate 56 is reversely mounted on the stud bolt 53, the distal end of the cylindrical projection 59 abuts against the inner surface of the front shell 11 around the seal member 57. In this case, since the protruding length of the cylindrical projection 59 is larger than the thickness of the seal member 57, the seal member 57 is positioned in a spaced relation to the front shell 11, and therefore a hermetic seal between the front shell 11 and the stud bolt 53 is not obtained. Further, the cut portion 60 formed in the distal end of the cylindrical projection 59 acts as a communication passage for communication between an inner side and an outer side of the cylindrical projection 59, and therefore air is introduced into the front-side constant-pressure chamber 19.

Figure 8:
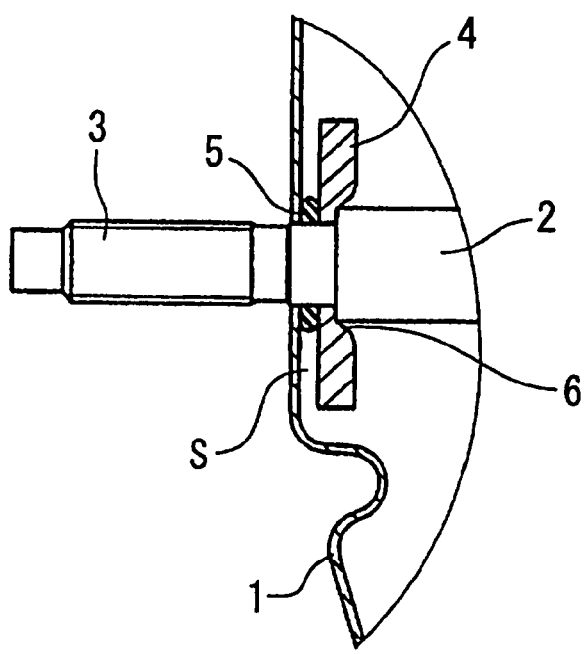
FIG. 8 is a cross-sectional view showing the reversely mounted position of a support plate in the seal structure of FIG. 7.

The pneumatic booster is connected to the master cylinder M, utilizing the stud bolt 53 and the nut N, and is subjected to a leak inspection. In this case, as shown in FIG. 1(B), if the support plate 56 is reversely mounted on the stud bolt 53, air flows into the front-side constant-pressure chamber 19 through a space between the front shell 11 and the stud bolt 53 and the cut portion 60 formed in the cylindrical projection 59 of the support plate 56. Consequently, the pneumatic booster is evaluated as a defective product (having a seal leak). Therefore, there is no problem such as that of the conventional technique (FIG. 8), i.e., shipment of a booster in which the support plate (4) is reversely mounted, and hence there is no risk of deformation of the front shell 11 resulting in gas leakage during use. On the other hand, a pneumatic booster that has been evaluated as a good product is shipped and mounted on a vehicle body utilizing the stud bolts 52 integral with the through-rods 51 and the stud bolts 55, and a brake pedal is connected to the input rod 34.

In this state, when the brake pedal is depressed, the input rod 34, and hence the valve plunger 35, advance. The air valve seat 40 formed in the rear end portion of the valve plunger 35 becomes separated from the poppet valve 37, to thereby open the air valve 41. Consequently, air flows into the small-diameter cylindrical portion 23b of the valve body 23 through the silencer 30 and the filter 31. This air is introduced into the rear-side working-pressure chamber 22 through the first air passage 26, and is further introduced into the front-side working-pressure chamber 21 through the second air passages 27 in the communication tubes 28. Consequently, a differential pressure is generated between the front-side and rear-side working-pressure chambers 21 and 22 and the front-side and rear-side constant-pressure chambers 19 and 20, to which a negative pressure is introduced. The front-side and rear-side power pistons 17 and 18 thrust due to this differential pressure, and thrust forces of the power pistons 17 and 18 are outputted through the valve body 23 and the output rod 46 towards the master cylinder M, thus starting to produce a servo effect. A reactive force resulting from this output is transmitted from the reaction disk 45 through the movable body 44 and the valve plunger 35 to the input rod 34.

On the other hand, when the pedaling force applied to the brake pedal is released, the input rod 34 retracts under a spring force of the return spring 43. Therefore, the valve plunger 35 retracts, and the air valve seat 40 formed in the rear end portion of the valve plunger 35 abuts against the poppet valve 37, to thereby close the air valve 41. On the other hand, the vacuum valve 39 is opened by the valve plunger 35 that moves the poppet valve 37 in a rightward direction in FIG. 3. Consequently, the negative pressure is introduced into the front-side and rear-side working-pressure chambers 21 and 22 through the negative-pressure passage 25 and the first and second air passages 26 and 27, to thereby release the differential pressure. Thereafter, the valve body 23 retracts under a spring force of the return spring 47 in the front-side constant-pressure chamber 19, and returns to the original position at which the stop key 49 abuts against the stepped portion 50 of the rear shell 12. At the same time, the valve plunger 35 also returns to its original position, thus closing the vacuum valve 39.

Figure 4A:
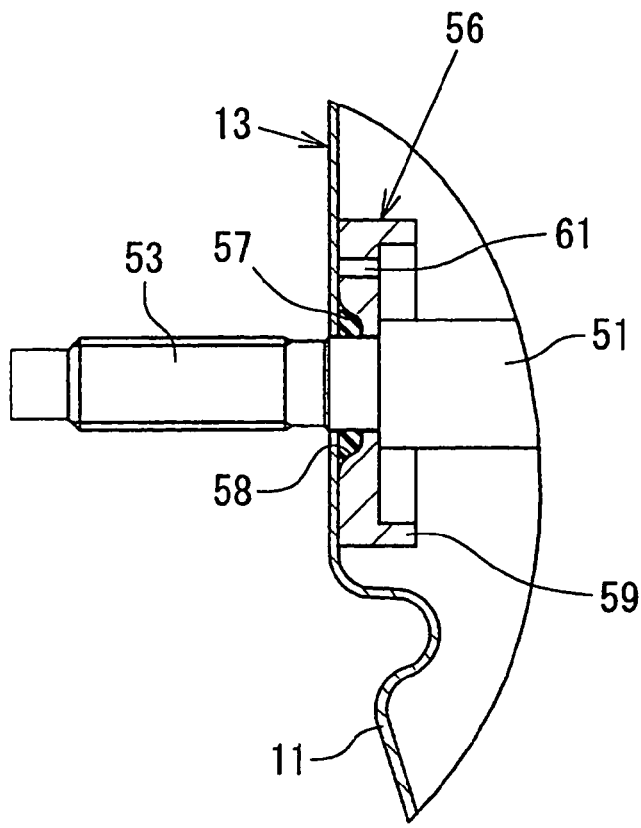
FIG. 4(A) is a cross-sectional view showing another example of a seal structure formed around the stud bolt in the pneumatic booster of the present invention, wherein a support plate is normally mounted.
Figure 4B:
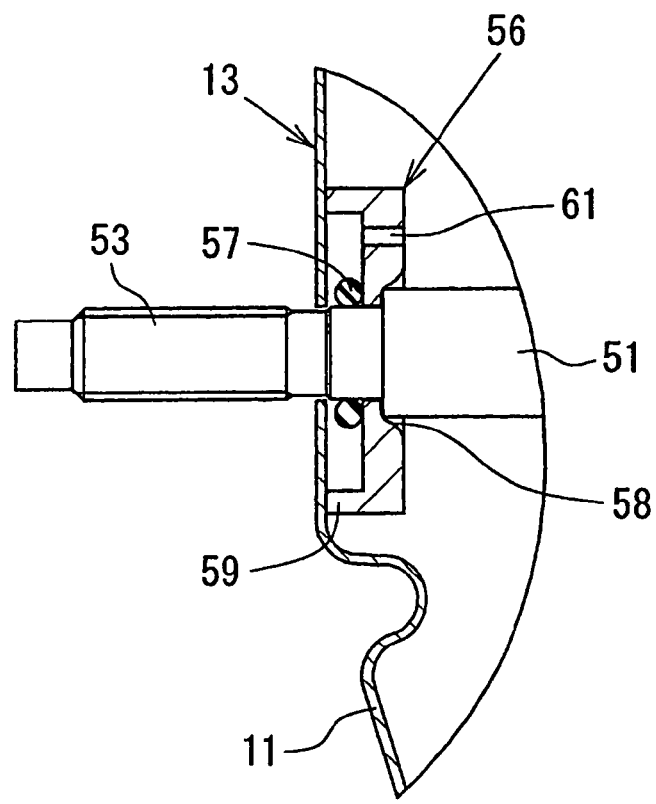
FIG. 4(B) is a cross-sectional view showing the reversely mounted position of the support plate in the seal structure of FIG. 4(A).

In the above embodiment, the cut portion 60, which is formed in the distal end of the cylindrical projection 59 of the support plate 56, is used as a communication passage for allowing communication between the inner side and the outer side of the cylindrical projection 59. Instead of the cut portion 60, a through-hole 61 such as that shown in FIG. 4(A) may be formed as the communication passage in the support plate 56. In this case, as shown in FIG. 4(B), if the support plate 56 is reversely mounted on the stud bolt 53, air flows into the front-side constant-pressure chamber 19 through the through-hole 61, and the pneumatic booster is evaluated as a defective product (having a seal leak) in a leak inspection.

Figure 5A:
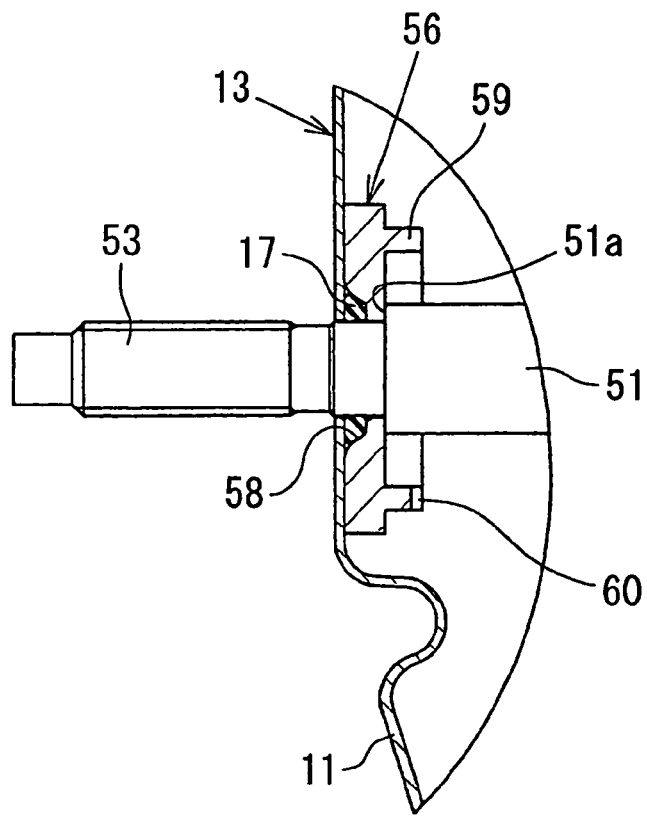
FIG. 5(A) is a cross-sectional view showing a further example of a seal structure formed around the stud bolt in the pneumatic booster of the present invention, wherein a support plate is normally mounted.
Figure 5B:
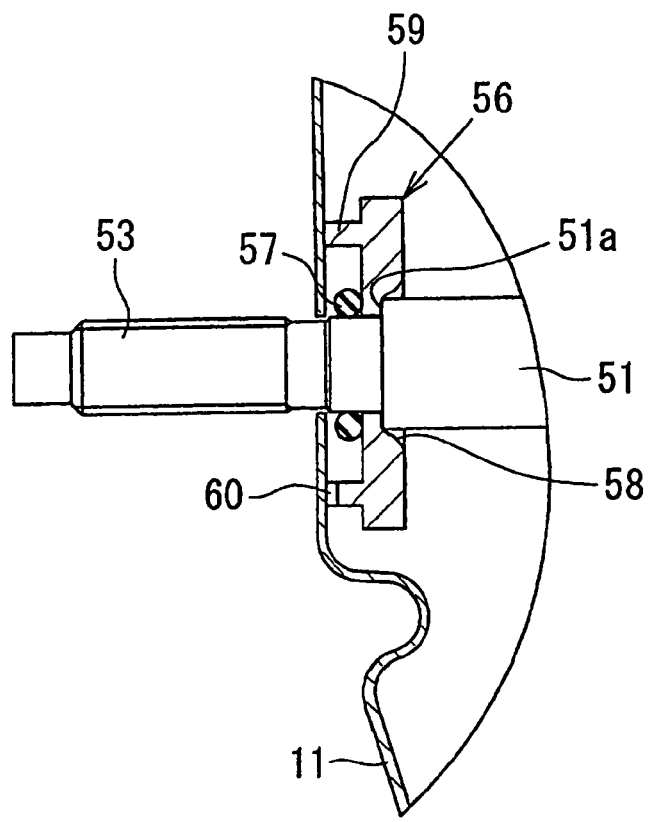
FIG. 5(B) is a cross-sectional view showing the reversely mounted position of the support plate in the seal structure of FIG. 5(A).

In the above embodiment, the cylindrical projection 59 extends from the outer circumferential edge of the support plate 56. However, as shown in FIG. 5(A), the cylindrical projection 59 may extend from a position between the outer circumferential edge of the support plate 56 and the center of the support plate 56. In this case, the position of the cylindrical projection 59 should be determined so that the support plate 56 does not interfere with the through-rod 51 when the support plate 56 is normally mounted on the stud bolt 53, as shown in FIG. 5(A), and the support plate 56 does not interfere with the seal member 57 when the support plate 56 is reversely mounted on the stud bolt 53, as shown in FIG. 5(B).

Instead of the cylindrical projection 59, circumferentially discontinuous projections may be formed in the support plate 56. In this case, a gap formed between the projections serves as a flow passage, and therefore the cut portion 60 [FIGS. 1(A) and 1(B), FIGS. 5(A) and 5(B)] or the through-hole 61 [FIGS. 4(A) and 4(B)] can be omitted. If the cylindrical projection 59 is simply abutted against the inner surface of the front shell 11, air flows through a slight gap between the cylindrical projection 59 and the front shell 11. Therefore, the present invention can be achieved without using the cut portion 60 or the through-hole 61. In this case, however, substantial time is required for air to flow into the front-side constant pressure chamber 19, thus extending the time for a leak inspection.

Figure 6:
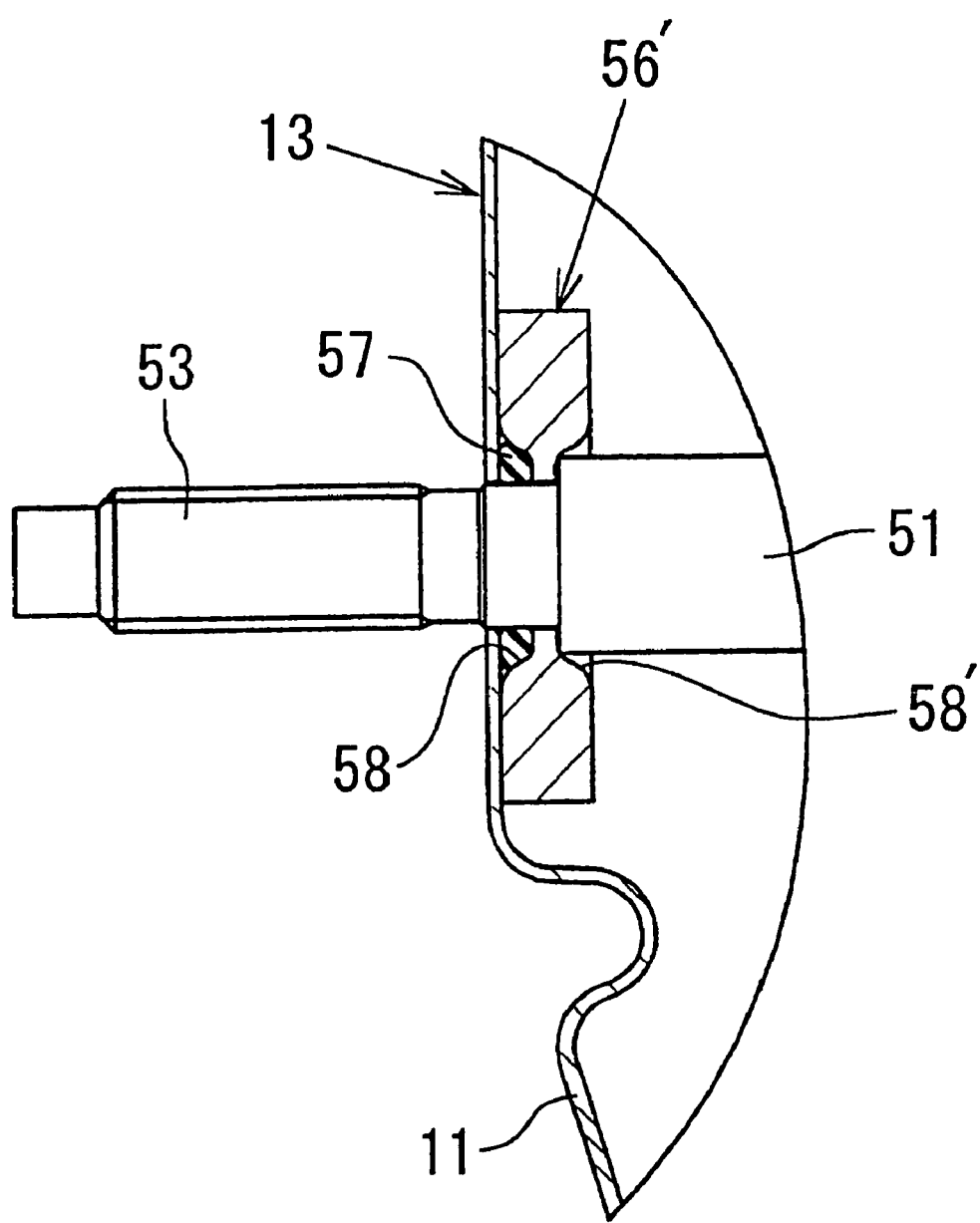
FIG. 6 is a cross-sectional view showing a further example of a seal structure formed around the stud bolt in the pneumatic booster of the present invention.
Figure 7:
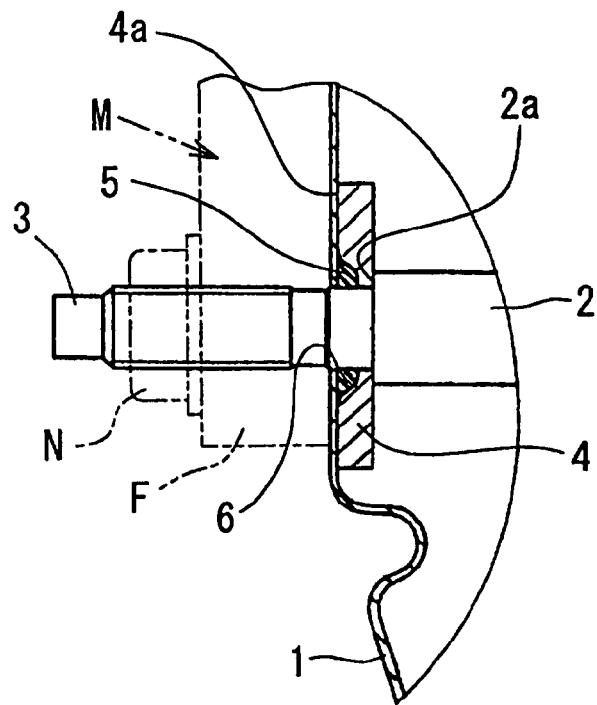
FIG. 7 is a cross-sectional view showing a seal structure formed around a stud bolt in a conventional pneumatic booster.

FIG. 6 shows another example of the support plate. A support plate 56' in this embodiment includes an annular groove 58' formed in a surface thereof opposite to the surface in which the annular groove 58 for the seal member 57 is formed, the annular groove 58' having a symmetric relation to the annular groove 58. Thus, a front surface and a rear surface of the support plate 56' are of symmetrical configuration relative to each other. Therefore, even when the support plate 56' is reversely mounted, one surface of the support plate 56' abuts against the front shell 11, and a supporting function of the support plate relative to the front shell 11 is not impaired.

In the above embodiments, a pneumatic booster is formed as a tandem type. However, the present invention may be applied to a single type pneumatic booster using a single power piston.

The pneumatic booster according to the above embodiment has seal failure when the support plate is reversely mounted on the rod. Therefore, reverse mounting of the support plate can be reliably detected in a leak inspection, to thereby markedly improve durability and reliability of the booster.

In the pneumatic booster according to another embodiment of the present invention, a front surface and a rear surface of the support plate are of symmetrical configuration relative to each other. Therefore, either the front surface or the rear surface of the support plate can be connected to the rod, without impairing a supporting function of the support plate relative to the front shell, to thereby markedly improve durability and reliability of the booster.

Although only some exemplary embodiments of this invention have been described in detail above, those skilled in the art will readily appreciate that many modifications to the exemplary embodiments are possible without materially departing from the novel teaching and advantages of this invention. Accordingly, all such modifications are intended to be included within the scope of this invention.

The entire disclosure of Japanese Patent Application No. 2003-399866 filed on Nov. 28, 2003 including specification, claims, drawings and summary is incorporated herein by reference in its entirety.

What is claimed is:

1. A pneumatic booster comprising:
 a shell body comprising a front shell and a rear shell;
 a power piston provided in the shell body;
 a rod extending through the power piston and connecting the front shell and the rear shell;
 a stud bolt formed on one end of the rod, the stud bolt extending through the shell body to the outside;
 a support member fitted around the stud bolt, the support member being engaged with the rod and abutted against an inner surface of the shell body; and
 a seal member provided in an annular groove formed in a surface of the support member, the seal member being adapted to seal a space between the shell body and the stud bolt,
 the support member having a projection formed on a surface thereof opposite to the surface in which the annular groove is formed,
 the projection having a protruding length greater than a thickness of the seal member,
 a distal end of the projection being adapted to abut against the shell body around the seal member when the support member is reversely mounted.

2. The pneumatic booster according to claim 1, wherein the support member is adapted to abut against an inner surface of the front shell of the shell body.

3. The pneumatic booster according to claim 1, wherein an inner diameter of the annular groove of the support member is larger than an outer diameter of a portion of the rod that is abutted against the support member.

4. The pneumatic booster according to claim 1, wherein the projection is located radially outward of the annular groove.

5. The pneumatic booster according to claim 1, wherein the projection is located radially outward of an outer diameter of a rod seal provided in a diaphragm of the power piston, the rod seal being adapted to seal the rod extending through the power piston.

6. The pneumatic booster according to claim 4, wherein the projection is formed at an outer circumferential edge of the support member.

7. The pneumatic booster according to claim 4, wherein the projection is formed between an outer circumferential edge of the support member and the center of the support member.

8. The pneumatic booster according to claim 1, wherein the projection of the support member has a cylindrical form, and the support member includes a communication passage for allowing communication between an inner side and an outer side of the cylindrical projection.

9. The pneumatic booster according to claim 8, wherein the communication passage comprises a cut portion formed in a distal end of the cylindrical projection.

10. The pneumatic booster according to claim 8, wherein the communication passage comprises a through-hole formed in the support member.

11. A pneumatic booster comprising:
 a shell body formed by a front shell and a rear shell;
 a power piston provided in the shell body;
 a rod extending through the power piston and connecting the front shell and the rear shell;
 a stud bolt formed on one end of the rod, the stud bolt extending through the shell body to the outside;
 a support member fitted around the stud bolt, the support member being engaged with the rod and abutted against an inner surface of the shell body; and
 a seal member provided in an annular groove formed in a surface of the support member, the seal member being adapted to seal a space between the shell body and the stud bolt,
 the support member including an annular groove which is formed in a surface of the support member opposite to the surface in which the annular groove for the seal member is formed and which has a symmetric relation to the annular groove for the seal member.

12. The pneumatic booster according to claim 11, wherein the support member is adapted to abut against an inner surface of the front shell of the shell body.

13. The pneumatic booster according to claim 11, wherein an inner diameter of the annular groove of the support member is larger than an outer diameter of a portion of the rod that is abutted against the support member.

14. The pneumatic booster according to claim 11, wherein a front surface and a rear surface of the support member are of symmetrical configuration relative to each other.

15. A seal structure comprising:
 a shell body;
 a stud bolt extending through the shell body; and
 a seal device for sealing a gap between the shell body and the stud bolt,
 the seal device, when mounted in a normal position, being adapted to seal the gap between the shell body and the stud bolt, and when mounted in an abnormal position, being adapted to allow communication between an inner side and an outer side of the shell body through the gap wherein the seal device includes:
 a support member provided on an inner surface of the shell body while being fitted around the stud bolt, the support member having a surface facing the inner surface of the shell body, an annular groove being formed in the surface of the support member so as to surround the stud bolt; and a seal member provided in the annular groove and adapted to seal the gap between the shell body and the stud bolt.

16. The seal structure according to claim 15, wherein the support member comprises:

a support member body in which the annular groove is formed; and a projection formed in a surface of the support member body opposite to the surface in which the annular groove is formed, a distal end of the projection being capable of abutting against the inner surface of the shell body around the seal member when the support member is reversely mounted, the projection having a protruding length greater than a thickness of the seal member.

17. A seal structure comprising:

a shell body;

a stud bolt extending through the shell body; and a seal device for sealing a gap between the shell body and the stud bolt, the seal device, when mounted in a first position, being adapted to seal the gap between the shell body and the stud bolt, and when mounted in a second position, being also adapted to seal the gap between the shell body and the stud bolt, wherein the seal device includes:

a support member provided on an inner surface of the shell body while being fitted around the stud bolt, the support member having a surface facing the inner surface of the shell body, a first annular groove being formed in the surface of the support member so as to surround the stud bolt; and a seal member provided in the first annular groove and adapted to seal the gap between the shell body and the stud bolt.

18. The seal structure according to claim 17, wherein:

the support member includes a second annular groove formed in a surface thereof opposite to the surface in which the first annular groove is formed; and the second annular groove is located in a symmetric relation to the first annular groove and has the same form as the first annular groove.

* * * * *